Patented Feb. 28, 1928.

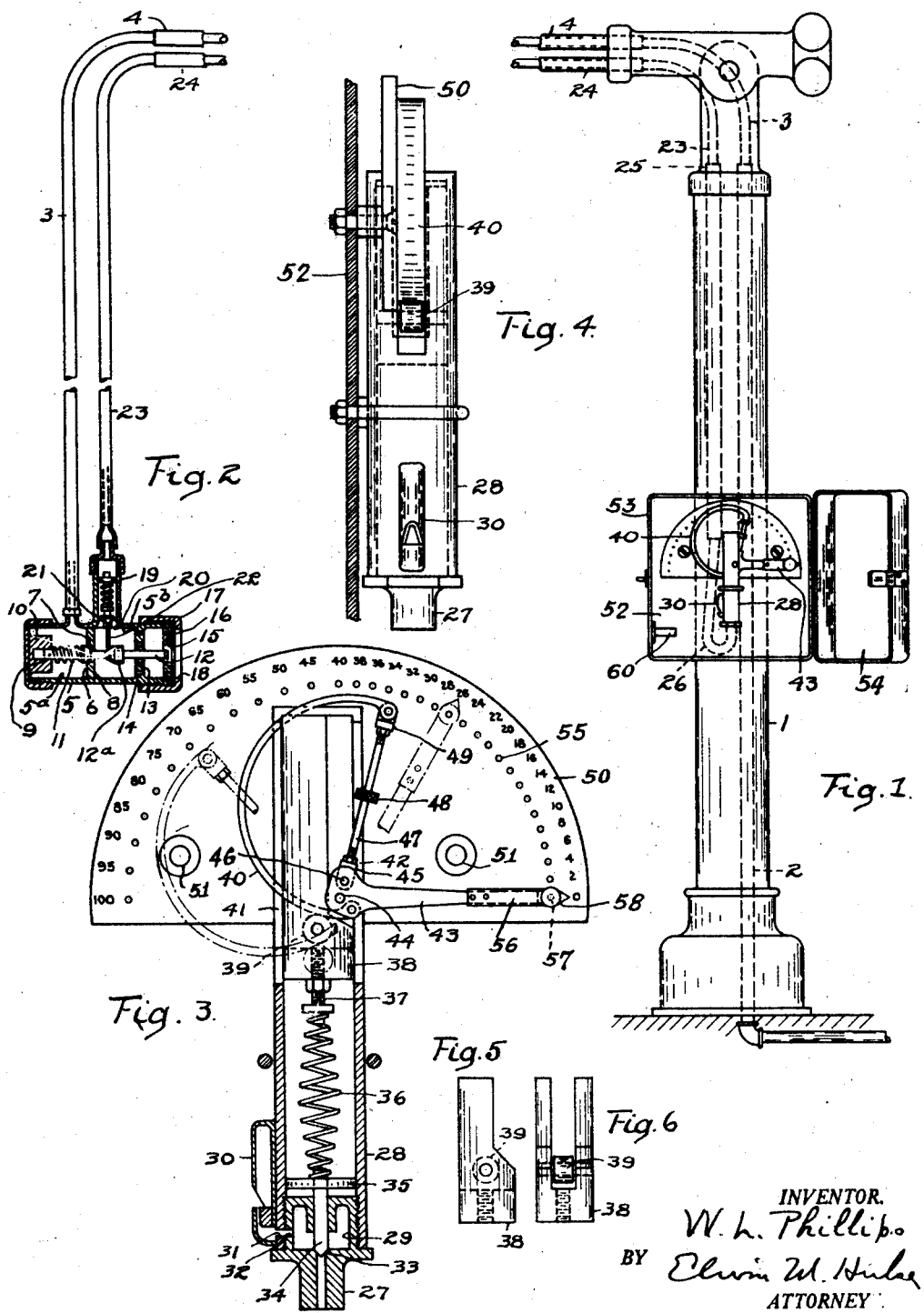

1,660,935

UNITED STATES PATENT OFFICE.

WESLEY L. PHILLIPS, OF FORT WAYNE, INDIANA.

AIR STAND.

Application filed May 13, 1926. Serial No. 108,798.

The invention relates to air stands for supplying air under pressure for inflating tires and for other uses, wherein a hose having a valve at one end is suitably connected to an air line disposed within a tower, the air being released from the hose by engaging the valve on the valve stem of the tire. Generally in such installations there is no provision made by which to determine when the desired degree of inflation has been reached, except by the use of a gage which is applied to the tire by way of test. Devices have been suggested by which to obtain a desired degree of inflation, but so far as I am now aware, none of them are entirely satisfactory.

The object of my invention is to provide an air stand with a simple means by which any desired degree of inflation of a tire or other article may be secured without danger of overinflation, a positive signal being given when the desired degree has been reached.

The invention consists in the provision of an audible signal that will be operated by the air under pressure when the selected pressure has been supplied to the article being inflated.

The invention is illustrated in the accompanying drawings, in which

Figure 1 is an elevational view of an air stand having the invention applied thereto; Fig. 2 a fraction of the hose and cross-section of the valve; Fig. 3 a front view of the signal and regulating mechanism; Fig. 4 a side elevational view of the same; Fig. 5 a front elevational view of the plunger and Fig. 6 a side elevational view of the plunger.

In the illustrative embodiment of the invention the signal mechanism is applied to a tower 1 but it will be evident that it may be applied to various forms of devices designed to deliver air under pressure. Within the tower is the usual air pipe 2 leading from the usual pressure tank. A hose 3 is connected to the upper end of this pipe 2 and may be led through a pipe 4 that is pivoted on the upper end of the tower in the usual manner and depend from the other end of the pipe. The hose could be connected to the inner end of the pipe and a second length could be connected to the outer end of the pipe, the pipe thus forming a part of the conduit. Both forms are in use at the present time.

The lower end of the hose is secured to a casing 5 having a valve 6 adapted to close a port 7 formed in a partition 8 that divides the casing into two compartments $5^a$ and $5^b$. The stem 9 of the valve is supported in a guide 10 and a spring 11 normally holds the valve on its seat about the port 7. A stem 12 projects from the opposite side of the valve and extends through a guide 13 having a plurality of passageways 14 therein. The end of this stem 12 is disposed in a tapered opening 15 formed in a resilient gasket 16, preferably a rubber gasket, that is clamped upon the end of the casing by a cap 17 that is threaded onto the casing and has a central opening 18 in its end wall.

When the casing is applied to a valve stem of a tire the tip of the latter stem enters the apertures 18 and 15 and the stems 9 and 12 of the valve 6 are moved longitudinally to unseat the valve 6. The air then flows through the port 7 and the passageways 14 into the tire.

An extension 19 is formed on the casing 5 that communicates with the compartment $5^b$ through a port 20 formed in the wall of the casing 5. A valve 21 normally closes this port and a stem 22 thereon is adapted to be engaged by a cam $12^a$ on the stem 12 of the valve 6, so that when the valve 6 is unseated the valve 21 is also unseated.

A hose 23 is connected to the extension 19 and leads through a pipe 24 similar to pipe 4 and similarly connected to a pipe 25 disposed within the tower 1. A hose 26 is connected to the lower end of this pipe 25 and to a nipple 27 that is threaded into the lower end of a cylinder 28. An air chamber 29 is formed in the nipple and a whistle 30 mounted on the cylinder has communication with the air chamber by way of the alined ports 31 and 32 formed in the walls of the cylinder and of the chamber.

The port 33 in the nipple is adapted to be closed by a valve 34 having a plunger 35 secured to its upper end, the plunger being disposed in the cylinder 28. A coiled spring 36 engages the upper side of this plunger and the upper end of the spring is engaged on a stud 37 that is adjustably mounted in a bifurcated plunger 38 that is also disposed in the cylinder.

A roller 39 is mounted between the bifurcations of the plunger 38 and it engages a ring member or eccentric 40 disposed in diametrically opposed slots 41 and 42 in the cylinder. The upper portion of the cylinder is, therefore, a guide for the ring member or eccentric 40 and the plungers 35 and 38.

The ring member 40 is relatively stiff and it is substantially bowed. The lower end of this ring member is suitably pivoted to the lower side of a lever 43 that is pivoted at 44 to the cylinder and is adapted to be swung through the slots 41 and 42. The pivotal point of the lever is preferably at one side of the axis of the cylinder and the pivotal point of the ring member on the lever is beyond the pivotal point of the lever in the zero position of the lever. The angle plate 45 is suitably pivoted at 46 to the lever 43 and threaded in the plate is a right and left hand threaded bolt 47 having thereon a gripper 48 by which to effect easy rotation of the bolt. The opposite end of the bolt is threaded into an angle plate 49 that is pivoted to the outer end of the ring member 40. By rotating the bolt 47 the eccentricity of the member 40 may be altered to secure an accurate adjustment of the parts operated by said member 40.

A disk 50, preferably a segment, is disposed adjacent to the lever 43 and is mounted by the bolts 51 on the back 52 of a cabinet or housing 53 that is fixed on the tower and has a door 54. A series of apertures or recesses 55 are formed in the disks and the disk is marked adjacent each aperture or recess to indicate pounds pressure in any desired arrangement. A spring plate 56 is secured to the lever and a pin 57 projects from the inner face of the plate and knob 58 is attached to the outer face of the plate. The pin is adapted to engage in any one of the graduated apertures or recesses 55.

By swinging the lever on its pivot to the desired graduation on the disk, the ring member 40 is rotated with it and as the member functions as a cam it depresses the plunger 38 and places a tension on the spring 36 that will require the pressure of air indicated by the selected graduation to overcome it and unseat the valve 34.

A pin 60 is mounted on an inner wall of the housing 53 upon which the casing 5 may be engaged to unseat the valve 6. If there is air under pressure in the conduit 3 it will unseat the valve 34 and operate the signal. The pin, therefore, enables the user to test the outfit before he applies the conduit to the article to be inflated.

Instead of using the individual hose 3 and 23, I may use the well known duplex hose, that is, two conduits in a single casing.

What I claim is:

1. The combination of a cylinder having a chamber at one end and a port forming a communication with the chamber and the exterior of the cylinder, a signal having communication with the chamber, a valve to control one of said communications, a reciprocable plunger within the cylinder, a resilient member between and engaging the plunger and the valve, an index-carrying arm pivotally mounted on the cylinder, an eccentric member carried by the arm and engaging the plunger, and a graduated scale to any one of the graduations on which the arm may be swung to cause the plunger to reciprocate for selectively adjusting the tension of the resilient member.

2. The combination with a stand of a cylinder mounted on the stand and having a port therein, a conduit having communication with the port, a signal having communication with the port, a valve to control one of the said communications, a plunger within the cylinder, a resilient member between and engaging the plunger and the valve for normally seating the valve, a pivotally mounted index-carrying arm, an eccentric member having a pivotal connection at each opposite end to the arm and having engagement with the plunger, means to adjust the eccentricity of said member and a graduated scale to any of the graduations of which the arm may be swung for reciprocating the plunger to selectively adjust the tension of the tension member In witness whereof, I have hereunto subscribed my name this 8th day of May, 1926.

WESLEY L. PHILLIPS.